United States Patent
Li

(10) Patent No.: US 12,323,502 B2
(45) Date of Patent: Jun. 3, 2025

(54) DATA TRANSFER METHOD, GATEWAY, AND SIGNAL AMPLIFIER

(71) Applicant: BEIJING XIAOMI MOBILE SOFTWARE CO., LTD., Beijing (CN)

(72) Inventor: Sen Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 419 days.

(21) Appl. No.: 17/875,129

(22) Filed: Jul. 27, 2022

(65) Prior Publication Data

US 2023/0319169 A1  Oct. 5, 2023

(30) Foreign Application Priority Data

Mar. 29, 2022 (CN) .......................... 202210325663.5

(51) Int. Cl.
*H04L 69/08* (2022.01)
*H04L 12/66* (2006.01)
*H04W 8/00* (2009.01)
*H04W 88/16* (2009.01)

(52) U.S. Cl.
CPC .............. *H04L 69/08* (2013.01); *H04L 12/66* (2013.01); *H04W 8/005* (2013.01); *H04W 88/16* (2013.01)

(58) Field of Classification Search
CPC ........ H04L 69/08; H04L 12/66; H04W 8/005; H04W 88/16
See application file for complete search history.

(56) References Cited

U.S. PATENT DOCUMENTS

| | | | | |
|---|---|---|---|---|
| 8,135,344 | B2* | 3/2012 | Krueger | .................. H04L 65/75 370/320 |
| 9,743,225 | B2* | 8/2017 | Lee | .......... H04W 4/80 |
| 9,955,291 | B2* | 4/2018 | Choi | ..................... H04W 72/20 |
| 2004/0098531 | A1* | 5/2004 | Hagg | .................. H04L 12/4604 710/315 |
| 2020/0404473 | A1* | 12/2020 | Lin | ........ H04W 76/40 |
| 2023/0179980 | A1* | 6/2023 | An | ......... H04W 16/26 455/41.2 |
| 2023/0199487 | A1* | 6/2023 | Shi | ..................... H04W 12/0433 380/270 |
| 2024/0031456 | A1* | 1/2024 | Wang | ..................... H04L 69/08 |

FOREIGN PATENT DOCUMENTS

CN           110730440 A        1/2020

OTHER PUBLICATIONS

Extended European Search Report issued May 25, 2023 in European Patent Application No. 22187782.2, 8 pages.

* cited by examiner

*Primary Examiner* — Blake J Rubin
(74) *Attorney, Agent, or Firm* — Oblon, McClelland, Maier & Neustadt, L.L.P.

(57) ABSTRACT

Aspects of the disclosure are directed to a data transfer method that can include obtaining a first data packet reported by a first node device; receiving a second data packet forwarded by a signal amplifier, wherein the second data packet is reported by a second node device to the signal amplifier; processing the first data packet and the second data packet to obtain target data information; transferring the target data information to a server.

15 Claims, 9 Drawing Sheets

DATA TRANSFER METHOD, GATEWAY, AND SIGNAL AMPLIFIER

CROSS-REFERENCE TO RELATED APPLICATIONS

This application is based upon and claims priority to Chinese Patent Application No. 202210325663.5 filed on Mar. 29, 2022, the entire content of which is incorporated herein by reference for all purposes.

BACKGROUND OF THE INVENTION

Field of the Invention

The present disclosure relates to the technical field of communication technology, and particularly to a data transfer method, device, gateway, signal amplifier, system and medium.

Description of the Related Art

At present, in the field of communication technology, when there are multiple node devices in the communication network, it is difficult for a single gateway to cover all node devices. The node device can be a communication device that can carry out data transmission in the communication network. For example, the node device can be a Bluetooth device (Bluetooth device, that is, an electronic device that supports Bluetooth functions), a Bluetooth data transmission device in the wireless Mesh network, etc.

In related technologies, when a single gateway cannot cover all node devices, multiple gateways are usually deployed in the communication network to meet the communication requirements that the signal covers all node devices.

In this way, when multiple gateways are laid out in the communication network, the hardware used by each gateway, Bluetooth protocol stack, wireless Mesh network protocol stack, and the version of the application service may be different, resulting in low data transmission consistency and affecting data transmission stability and performance.

SUMMARY OF THE INVENTION

According to a first aspect of embodiments of the present disclosure, there is provided a data transfer method, comprising: obtaining a first data packet reported by a first node device; receiving a second data packet forwarded by a signal amplifier, wherein the second data packet is reported by a second node device to the signal amplifier; processing the first data packet and the second data packet to obtain target data information; transferring the target data information to a server.

According to a second aspect of embodiments of the present disclosure, there is provided a data transfer method, comprising: obtaining a second data packet reported by a second node device; forwarding the second data packet to a gateway, so that the gateway processes a first data packet and the second data packet to obtain target data information, wherein the first data packet is reported to the gateway by a first node device.

According to a third aspect of embodiments of the present disclosure, there is provided a gateway, comprising: a processor, configured to obtain a first data packet reported by a first node device and receive a second data packet forwarded by a signal amplifier, and provide the first data packet and the second data packet to an application service, wherein the second data packet is reported to the signal amplifier by a second node device; the application service, configured to process the first data packet and the second data packet to obtain target data information, and transfer the target data information to a server.

According to a fourth aspect of embodiments of the present disclosure, there is provided a signal amplifier, comprising: a processor, configured to obtain a second data packet reported by a second node device, and forward the second data packet to a gateway, so that the gateway processes a first data packet and the second data packet to obtain target data information, wherein the first data packet is reported to the gateway by a first node device.

Additional aspects and advantages of the present disclosure will be given in the following description, some of which will become apparent from the following description, or known through the practice of the present disclosure.

BRIEF DESCRIPTION OF THE DRAWINGS

The above and/or additional aspects and advantages of the present disclosure will be apparent and easy to understand from the following description of the embodiments together with the drawings, wherein.

DETAILED DESCRIPTION OF THE PREFERRED EMBODIMENTS

Figure 1:
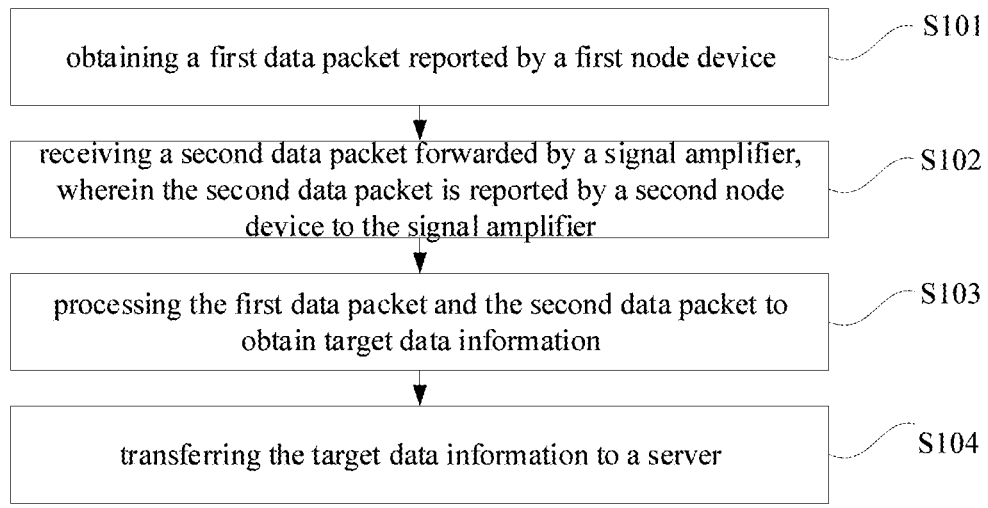
FIG. 1 is a flow chart of the data transfer method according to an embodiment of the present disclosure.

The following describes in detail the embodiments of the present disclosure, examples of which are shown in the drawings, wherein the same or similar reference numerals represent the same or similar elements or elements having the same or similar functions. The embodiments described below with reference to the drawings are exemplary and are intended to explain the present disclosure, but are not to be understood as limiting the present disclosure. On the contrary, the embodiments of the present disclosure include all variations, modifications and equivalents that fall within the spirit and connotation of the appended claims.

FIG. 1 is a flow chart of the data transfer method according to an embodiment of the present disclosure. It should be noted that the main body of the data transfer method of this embodiment is a data transfer device, which can be implemented by software and/or hardware. This device can be configured in electronic equipment, which may include but not limited to terminals, server terminals, etc.

This embodiment can be applied to a gateway. The gateway can be a computer system or device responsible for forwarding and transferring data in a communication network. The gateway can package the received data information to meet the requirements of the target system to which the data is transferred. The gateway can be used for both wide area network interconnection and local area network interconnection.

In the embodiment of the present disclosure, the gateway can be, for example, a Bluetooth gateway. The Bluetooth gateway can be a Bluetooth communication device set up for a Bluetooth terminal device. The Bluetooth gateway can control a Bluetooth terminal device and collect data by means of broadcast package, and transfer the received data to a remote server.

In some communication cases, such as a wide area network or a local area network, it is common to arrange multiple gateways that establish communication connections to implement the processing logic of transferring and forwarding data in the wide area network or local area network.

In the embodiment of the present disclosure, the communication network can be, for example, a Bluetooth communication network. The Bluetooth communication network, i.e., a communication network that can transfer wireless data based on Bluetooth signals, is a low-cost, low-energy, close-range wireless connected communication network. Servers, Bluetooth gateways, multiple signal amplifiers and multiple node devices can be arranged in the Bluetooth communication network. The communication connection between the server and the node devices in the Bluetooth communication network is established by the Bluetooth gateway and multiple signal amplifiers. The node devices can transfer data to the server through the Bluetooth gateway, or the node devices can transfer data to the signal amplifiers, which forward the data to the Bluetooth gateway and trigger the Bluetooth gateway to forward the data to the server. The server can send control messages to the node devices through the Bluetooth gateway, or send control messages to the signal amplifiers through the Bluetooth gateway, the signal amplifiers then send the control messages to the node devices.

In which, the signal amplifier is a communication device that can expand the signal range of the gateway in the communication network. In the Bluetooth communication network, the signal amplifier can be, for example, a Bluetooth signal amplifier, which can relay data transfer between the Bluetooth gateway and the node device, that is, transfer the data at the Bluetooth gateway to the node device and transfer the data at the node device to the Bluetooth gateway, so as to trigger the Bluetooth gateway to transfer data to the server.

Node device can be a communication device that can transfer data in the communication network. The node device can be for example a Bluetooth device (i.e. electronic device that supports Bluetooth functions), Bluetooth data transfer device in wireless Mesh network, etc. In the embodiment of the present disclosure, the node device can be, for example, a Bluetooth device, and the signal amplifier can be, for example, a Bluetooth signal amplifier.

As illustrated in FIG. 1, the data transfer method can include the following steps:

S101: obtaining a first data packet reported by a first node device. The first node device can be a communication device that can transfer data in the communication network. The first node device can be for example a Bluetooth device (i.e. electronic device that supports Bluetooth functions), Bluetooth data transfer device in wireless Mesh network, etc.

The first data packet can refer to the communication data packet encapsulated by data information when the first node device communicates directly with the gateway (when this node device is a Bluetooth device, the first data packet can be, for example, a Bluetooth data packet). This first data packet can be configured to support the information transmission between the first node device and the gateway and the server in the communication network. The first data packet can be encapsulated with, for example, a communication interaction message or a data exchange message, etc.

In the embodiment of the present disclosure, when obtaining the first data packet reported by the first node device, the first node device can encapsulate the application data and communication interaction data to obtain the corresponding communication data packet, and then the first node device can transfer the communication data packet to the gateway, which can monitor the communication data packet reported by the first node device in its own space in real time, After monitoring the communication data packet reported by the first node device, the communication data packet transferred by the first node device can be received through the underlying Bluetooth hardware integrated in the gateway, and the received communication data packet can be used as the first data packet reported by the first node device, so as to obtain the first data packet reported by the first node device.

Figure 2:
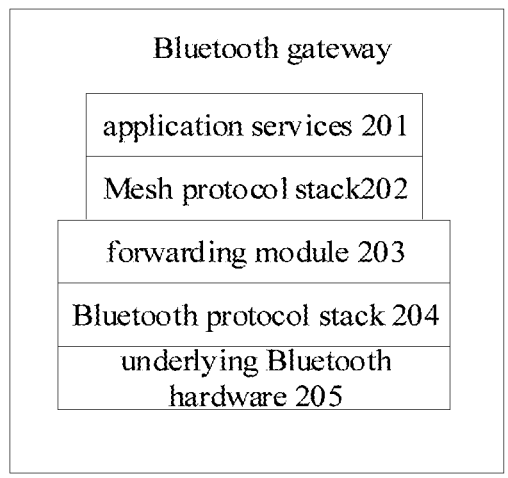
FIG. 2 is a schematic diagram of the gateway according to an embodiment of the present disclosure.

For example, as illustrated in FIG. 2, which is a schematic diagram of the gateway according to an embodiment of the present disclosure, the gateway can be, for example, a Bluetooth gateway. In the Bluetooth gateway, there is integrated application services 201, a mesh protocol stack 202, a first forwarding module 203, a Bluetooth protocol stack 204 and a underlying Bluetooth hardware 205 (the underlying Bluetooth hardware 205 can be referred as the first communication component, being the physical hardware for communication between the Bluetooth gateway and the node device and the signal amplifier, and is configured to receive the first data packet reported by the node device in the Bluetooth communication network). The first forwarding module 203 is configured to receive and convert the communication data packet received by the underlying Bluetooth hardware 205, and can also be configured to control the execution of data transfer by the underlying Bluetooth hardware 205. When obtaining the first data packet reported by the first node device, the first node device transfers the communication data packet to the Bluetooth gateway. The underlying Bluetooth hardware 205 integrated in the Bluetooth gateway receives the communication data packet uploaded by the first node device, and uses the received communication data packet as the first data packet reported by the first node device.

S102: receiving a second data packet forwarded by a signal amplifier, wherein the second data packet is reported by a second node device to the signal amplifier. The signal amplifier refers to a relay communication device to transfer data with the node device and the Bluetooth gateway in the communication network. The signal amplifier can be configured to cover the communication signal of node device in a certain area. When the signal amplifier is a Bluetooth amplifier, it can be integrated with forwarding module, Bluetooth protocol stack and underlying Bluetooth hardware.

Figure 3:
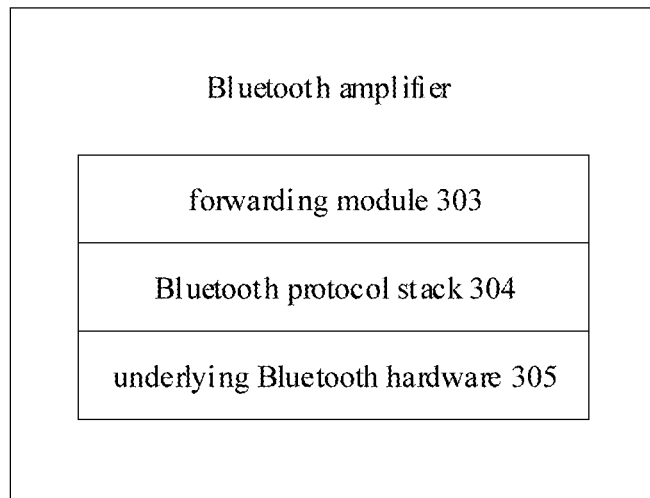
FIG. 3 is a schematic diagram of the signal amplifier according to an embodiment of the present disclosure.

For example, as illustrated in FIG. 3, which is a schematic diagram of the signal amplifier according to an embodiment of the present disclosure, the signal amplifier can be a Bluetooth amplifier. The Bluetooth amplifier can be integrated with a second forwarding module 303, a Bluetooth protocol stack 304 and an underlying Bluetooth hardware 305. The underlying Bluetooth hardware 305 (the underlying Bluetooth hardware 305 can be referenced as the second communication component, being the physical hardware for communication between the signal amplifier and the node device and the Bluetooth gateway, and is configured to receive the second data packet reported by the second node device and send the control message from the server to the second node device). The second forwarding module 303 is configured to receive the data information between the Bluetooth conversion gateway and the Bluetooth amplifier, and control the execution of the data transfer of the underlying Bluetooth hardware 305. The Bluetooth protocol stack 304 is responsible for driving the underlying Bluetooth hardware 305.

The second node device can be a communication device that can communicate directly with the signal amplifier. The second node device can be for example a Bluetooth device (i.e. electronic device that supports Bluetooth functions), Bluetooth data transfer device in wireless Mesh network, etc.

In the embodiment of the present disclosure, the first node device and the second node device can be located in the same or different space areas. When the first node device and the second node device are located in different space areas, with the help of the signal amplifier in the space area where the second node device is located, the gateway located in the space area where the first node device is located can be expanded accordingly. Accordingly, the number of signal amplifiers In the embodiment of the present disclosure can also be more than one, that is, each signal amplifier is respectively connected with the gateway to realize the effective signal coverage of multiple space areas.

The second data packet can refer to the communication data packet forwarded by the signal amplifier to the gateway after the second node device uploads the data packet to the signal amplifier (when the second node device is a Bluetooth device, the second data packet can be, for example, a Bluetooth data packet). The second data packet can be encapsulated with an application data of the second node device or a communication interaction data, etc.

In the embodiment of the present disclosure, the communication connection between the gateway and each signal amplifier can be pre-established, and then each signal amplifier can monitor the communication data packet of the second node device in its own space. When the communication data packet transferred by the second node device is monitored, the communication data packet can be captured and forwarded to the gateway. As each signal amplifier can monitor the application message of the second node device in its own space, that is, the communication data packet sent by a second node device may be captured by multiple signal amplifiers, the impact of the poor communication network between the node device and the signal amplifier on the transfer of communication data packets can be effectively avoided, ensuring the success probability that the communication data packet sent by the second node device can be uploaded to the server, and the communication effect.

In the embodiment of the present disclosure, when receiving the second data packet forwarded by the signal amplifier, the second node device can encapsulate the application data or communication interaction data to obtain the communication data packet of the second node device, and then the second node device uploads the communication data packet to the signal amplifier, which can monitor the communication data packet reported by the second node device in its own space in real time. After monitoring the communication data packet reported by the second node device, the signal amplifier can capture the communication data packet uploaded by the second node device, and then forward the received communication data packet to the gateway. The gateway receives the communication data packet forwarded by the signal amplifier, and uses the obtained communication data packet as the second data packet, to realize the reception of the second data packet forwarded by the signal amplifier.

For example, the signal amplifier can be a Bluetooth amplifier, when receiving the second data packet forwarded by the Bluetooth amplifier, the Bluetooth gateway can initiate the Bluetooth application service integrated in the Bluetooth gateway. The Bluetooth gateway calls the forwarding module through the Bluetooth application service, and obtains the hardware identification of the underlying Bluetooth hardware of all Bluetooth amplifiers connected with the Bluetooth gateway, so as to establish the communication connection between the Bluetooth gateway and each Bluetooth amplifier. Then, Each Bluetooth amplifier can monitor the communication data packet of the second node device in its own space in real time. When the communication data packet transferred by the second node device is monitored, the communication data packet can be captured and forwarded to the Bluetooth gateway, and then the Bluetooth gateway receives the communication data packet from the second node device forwarded by the Bluetooth amplifier. The underlying Bluetooth hardware of the Bluetooth gateway receives the communication data packet forwarded by the signal amplifier and uses the received communication data packet as the second data packet.

S103: processing the first data packet and the second data packet to obtain target data information. The target data information can refer to the data information obtained after protocol conversion and application processing of the data in the communication data packet. The target data information obtained after processing meets the data format specified in the data transfer protocol, and the target data information can be transferred to the server by the gateway.

In the embodiment of the present disclosure, the first and second data packets can be processed after obtaining the first data packet reported by the first node device and receiving the second data packet forwarded by the signal amplifier, to obtain the targeted data information transferred to the service.

In the embodiment of the present disclosure, when processing the first and second data packets to obtain the target data information, a parsing and a data format conversion can be performed for the first data packet and the second data packet. The data transfer protocol can be determined when the gateway transfers data to the server, and can be analyzed to obtain the data transfer format specified in the data transfer protocol when the gateway transfers data to the server. The first data packet and the second data packet are parsed to obtain the communication interaction data and application data before the encapsulation. The parsed data is converted according to the data transfer format, so as to obtain the converted data.

In the embodiment of the present disclosure, after performing the parsing and the data format conversion for the first and second data packets to obtain the processed data, an application data processing can be performed on the processed data, the communication interaction data in the first data packet and the second data packet can be analyzed to obtain the application service type of the data in the data packet. For example, the application service type can be logic operation of the data, or re-encapsulation of the data. According to the processing logic of the application service type obtained from the analysis, the converted data is processed to obtain the processed data information, and the processed data information is used as the target data information.

For example, the gateway can be a Bluetooth gateway. As shown in the schematic diagram of the Bluetooth gateway in FIG. 2, the Bluetooth gateway may be integrated with application services 201, the application service 201 is a service component that can perform data processing in the Bluetooth gateway. The application service 205 can be configured to perform application processing on the data in the communication data packet according to the application processing logic. The application processing can, for example, perform logical operation on the data in the communication data packet, and re-encapsulate the data processed with the logical operation. When processing the first data packet and the second data packet to obtain the target data information, the Bluetooth protocol stack 204 integrated in the Bluetooth gateway can drive the underlying Bluetooth hardware 205, report the first and second data packets received by the underlying Bluetooth hardware 205 to the first forwarding module 203 in the Bluetooth gateway. The first forwarding module 203 receives and converts the first and second data packets, the mesh protocol stack 202 integrated in the first forwarding module 203 parses and converts the first data packet and the second data packet to obtain the processed data information, reports the processed data information to the application service 205 integrated in the Bluetooth gateway. The application service 205 performs an application data processing on the parsed data information according to the corresponding application processing logic, to obtain the data information processed according to the application processing logic, and use the processed data information as the target data information.

S104: transferring the target data information to a server. In the embodiment of the present disclosure, after processing the first data packet and the second data packet to obtain the target data information, the target data information can be transferred to the server, to realize the data communication between the first node device and the second node device and the server in the communication network.

In the embodiment of the present disclosure, the gateway can obtain the first data packet reported by the first node device and receive the second data packet forwarded by the signal amplifier, and then perform the data conversion on the received first data packet and the second data packet, and perform the application data processing on the converted data information according to the corresponding application processing logic to obtain the processed target data information. Then the gateway can transmit the processed target data information to the server, which is configured with a communication data interface, and the server receives the target data information through the communication data interface to realize the transfer of the target data information to the server.

Figure 4:
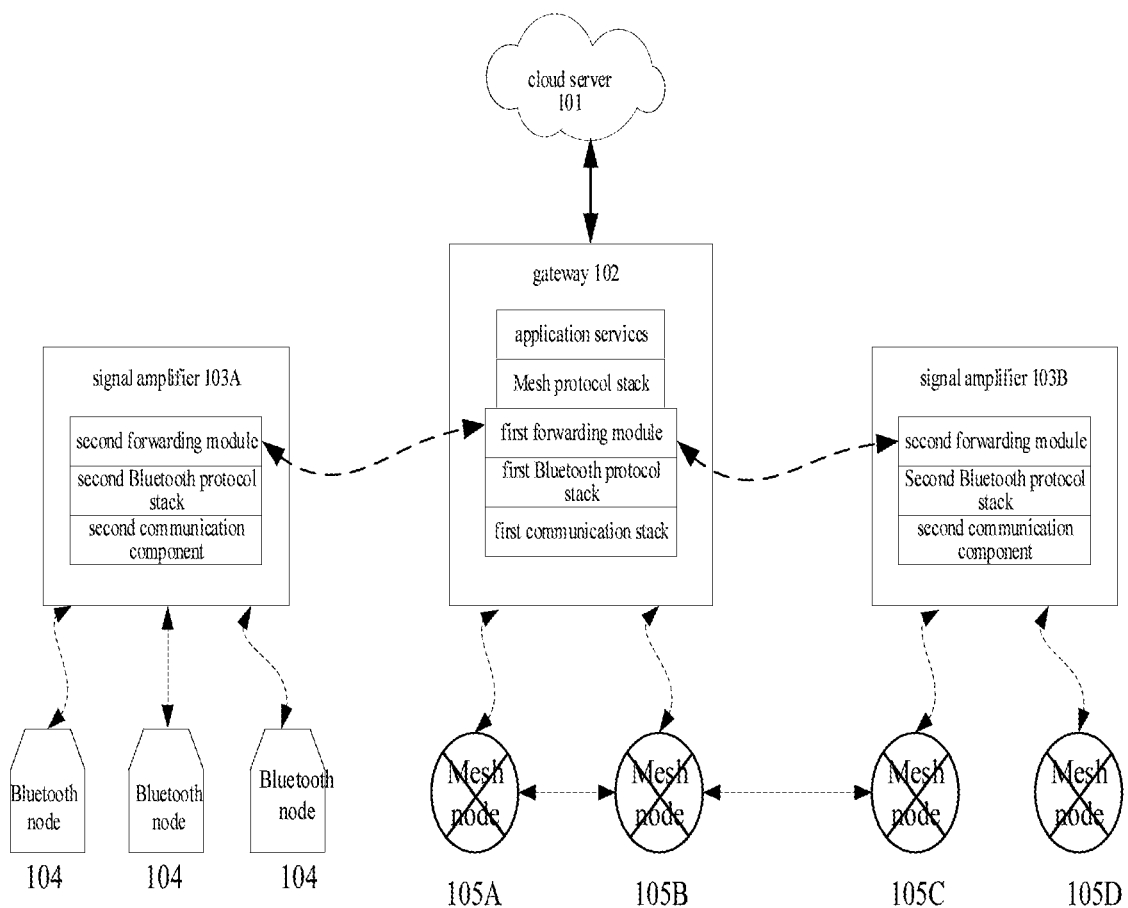
FIG. 4 is a schematic diagram of the arrangement of communication nodes in the communication network according to an embodiment of the present disclosure.

For example, as illustrated in FIG. 4, which is a schematic diagram of the arrangement of communication nodes in the communication network according to an embodiment of the present disclosure, the communication network can be Bluetooth communication network. The Bluetooth communication network is only configured with a Bluetooth gateway 102, and may be configured with multiple signal amplifiers 103A, 103B. The gateway 102 is integrated with an application service, a Mesh protocol stack, a first forwarding module, a first Bluetooth protocol stack and a first communication component. The signal amplifiers 103A and 103B are integrated with a second forwarding module, a second Bluetooth protocol stack and a second communication component. The first communication component is the physical hardware that communicates with the signal amplifier and the first node device in the gateway, and the second communication component is the physical hardware that communicates with the gateway and the second node device in the signal amplifier. The first Bluetooth protocol stack is configured to drive the first communication component to work, and the second Bluetooth protocol stack is configured to drive the second communication component to work. The first forwarding module is the communication component configured to receive and convert the communication data packet in the gateway, and the second forwarding module is the communication component configured to receive and convert the communication data packet in the signal amplifier. The Mesh node 105A and mesh node 105B directly connected to the gateway 102 can be referenced as the first node device, and other node devices directly connected to the gateway in the communication network can also be referenced as the first node device. The Bluetooth node 104 directly connected to the signal amplifier 103A can be referenced as the second node device, the Mesh node 105C and Mesh node 105D directly connected to the signal amplifier 103B can be referenced as the second node device, and other node devices directly connected to the signal amplifier in the communication network can also be referenced as the second node device. The first node device can transfer the first data packet to the gateway 102, the first communication component of gateway 102 obtains the first data packet transferred by the first node device, and the second node device can report the second data packet to the signal amplifier 103A and signal amplifier 103B. The second communication component of signal amplifier 103A and signal amplifier 103B receives the second data packet reported by the second node device and forwards the second data packet to gateway 102. The gateway 102 receives the second data packet forwarded by the signal amplifier 103A and signal amplifier 103B, and performs protocol conversion and application data processing on the received first and second data packets to obtain the target data information, and then the gateway 102 transfers the target data information to the cloud server 101.

In this embodiment, through obtaining the first data packet reported by the first node device and receiving the second data packet forwarded by the signal amplifier, wherein the second data packet is reported by the second node device to the signal amplifier, and processing the first data packet and the second data packet to obtain the target data information, and transferring the target data information to the server, the joint gateway and signal amplifier are realized to effectively cover the signals of multiple node devices, which can effectively ensure the consistency effect of data transfer, and improve the data transfer stability and transfer performance.

Figure 5:
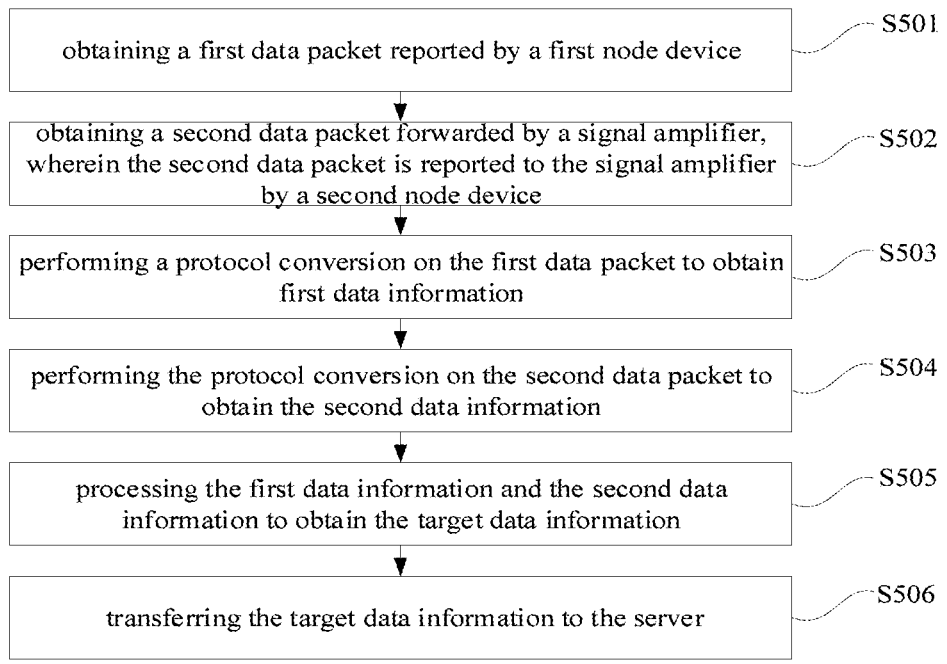
FIG. 5 is a flow chart of the data transfer method according to another embodiment of the present disclosure.

FIG. 5 is a flow chart of the data transfer method according to another embodiment of the present disclosure. The main body of this embodiment can be a gateway, the explanation of the gateway is with reference to the above embodiment, which will not be repeated hereinafter. As illustrated in FIG. 5, the data transfer method can include the following steps:

S501: obtaining a first data packet reported by a first node device.

S502: obtaining a second data packet forwarded by a signal amplifier, wherein the second data packet is reported to the signal amplifier by a second node device.

The description of S501-S502 is with reference to the above embodiment, which will not be repeated hereinafter.

S503: performing a protocol conversion on the first data packet to obtain first data information. The first data information refers to the data information obtained by protocol conversion of the data in the first data packet according to the communication protocol, the protocol conversion can be, for example, data format conversion for the first data packet according to the data unit format defined in the communication protocol, or data filling for the data information in the first data packet.

In the embodiment of the present disclosure, after obtaining the first data packet reported by the first node device, the protocol conversion can be performed for the first data packet to obtain the first data information.

In the embodiment of the present disclosure, when performing the protocol conversion on the first data packet to obtain the first data information, the data transfer protocol can be obtained, and the data transfer protocol can be parsed to obtain the data transfer format supported in the process of data transfer, the data in the first data packet is converted according to the data transfer format to obtain the converted data information, and the converted data is used as the first data information.

In other embodiments of the present disclosure, when performing the protocol conversion on the first data packet to obtain the first data information, the first data packet can be parsed to obtain the data information before the encapsulation. The data filling for the data information in the first data packet can be performed according to the data transfer protocol, for example, the header data information can be added to the data information to mark the data format and data transfer destination address, so as to obtain the data information after the data filling, and the processed data information is used as the first data information.

For example, if the gateway is a Bluetooth gateway, the Bluetooth protocol stack of the Bluetooth gateway can drive the underlying Bluetooth hardware, the first data packet can be uploaded to the forwarding module of the Bluetooth gateway by the underlying Bluetooth hardware, the first data packet is parsed, and it is performed a protocol conversion on the data in the first data packet according to the data transfer protocol provided by the Mesh protocol stack, and it is performed a format conversion on the first data packet according to the communication data unit format defined in the communication transfer protocol, so as to obtain the data information in the communication format, and the converted data information is used as the first data information.

S504: performing the protocol conversion on the second data packet to obtain the second data information. The second data information refers to the data information obtained by protocol conversion of the data in the second data packet transferred by the signal amplifier according to the communication protocol, the protocol conversion can be, for example, data format conversion for the second data packet according to the data unit format defined in the communication protocol, or data filling for the data information in the second data packet.

In the embodiment of the present disclosure, after receiving the second data packet forwarded by the signal amplifier, the protocol conversion for the second data packet can be performed to obtain the second data information.

In the embodiment of the present disclosure, when performing the protocol conversion on the second data packet to obtain the second data information, the data transfer protocol can be obtained, and the data transfer protocol can be parsed to obtain the data transfer format supported in the process of data transfer, the data in the second data packet is converted according to the data transfer format to obtain the converted data information, and the converted data is used as the second data information.

In other embodiments of the present disclosure, when performing the protocol conversion on the second data packet to obtain the second data information, the second data packet can be parsed to obtain the data information before the encapsulation. The data filling for the data information in the second data packet can be performed according to the data transfer protocol, for example, the header data information can be added to the data information to mark the data format and data transfer destination address, so as to obtain the data information after the data filling, and the processed data information is used as the second data information.

For example, if the gateway is a Bluetooth gateway, the Bluetooth protocol stack of the Bluetooth gateway can drive the underlying Bluetooth hardware, the second data packet can be uploaded to the forwarding module of the Bluetooth gateway by the underlying Bluetooth hardware, the second data packet is parsed, and it is performed a protocol conversion on the data in the second data packet according to the data transfer protocol provided by the Mesh protocol stack, and it is performed a format conversion on the second data packet according to the communication data unit format defined in the communication transfer protocol, so as to obtain the data information in the communication format, and the converted data information is used as the second data information.

S505: processing the first data information and the second data information to obtain the target data information. In the embodiment of the present disclosure, after performing a protocol conversion on the first data packet to obtain the first data information and performing the protocol conversion on the second data packet to obtain the second data information, the first data information and the second data information can be processed to obtain the target data information.

In the embodiment of the present disclosure, when processing the first data information and the second data information to obtain the target data information, the first data information and the second data information can be analyzed to determine their application service type. For example, the application service type can be logic operation of the data, or re-encapsulation of the data. A data processing logic is determined according to the application service type obtained from the analysis. According to the data processing logic, the first data information and the second data information are processed to obtain the processed data information, and the processed data information is used as the target data information.

For example, if the gateway is a Bluetooth gateway, the first data information and the second data information can be reported to the application service integrated in the Bluetooth gateway. An application data processing on the first data information and the second data information is performed according to the corresponding processing logic in the Bluetooth application service. The application processing logic can, for example, perform logical operation on the data or re-encapsulate the data, to obtain the data information processed according to the application data processing, and use the obtained data information as the target data information.

In the embodiment of the present disclosure, through performing a protocol conversion on the first data packet to obtain the first data information and performing the protocol conversion on the second data packet to obtain the second data information, and then processing the first data information and the second data information to obtain the target data information, the data information in conformity with the communication transfer protocol can be obtained by protocol conversion, which ensures the smooth implementation of subsequent application processing of data information, effectively ensures the implementation of data communication process, and contributes to improve the stability of data transfer.

S506: transferring the target data information to the server. The description of S506 is with reference to the above embodiment, which will not be repeated hereinafter.

In this embodiment of the present disclosure, through obtaining the first data packet reported by the first node device and receiving the second data packet forwarded by the signal amplifier, wherein the second data packet is reported by the second node device to the signal amplifier, and processing the first data packet and the second data packet to obtain the target data information, and transferring the target data information to the server, the joint gateway and signal amplifier are realized to effectively cover the signals of multiple node devices, which can effectively ensure the consistency effect of data transfer, and improve the data transfer stability and transfer performance. Through performing a protocol conversion on the first data packet to obtain the first data information and performing the protocol conversion on the second data packet to obtain the second data information, and then processing the first data information and the second data information to obtain the target data information, the data information in conformity with the communication transfer protocol can be obtained by protocol conversion, which ensures the smooth implementation of subsequent application processing of data information, effectively ensures the implementation of data communication process, and contributes to improve the stability of data transfer.

Figure 6:
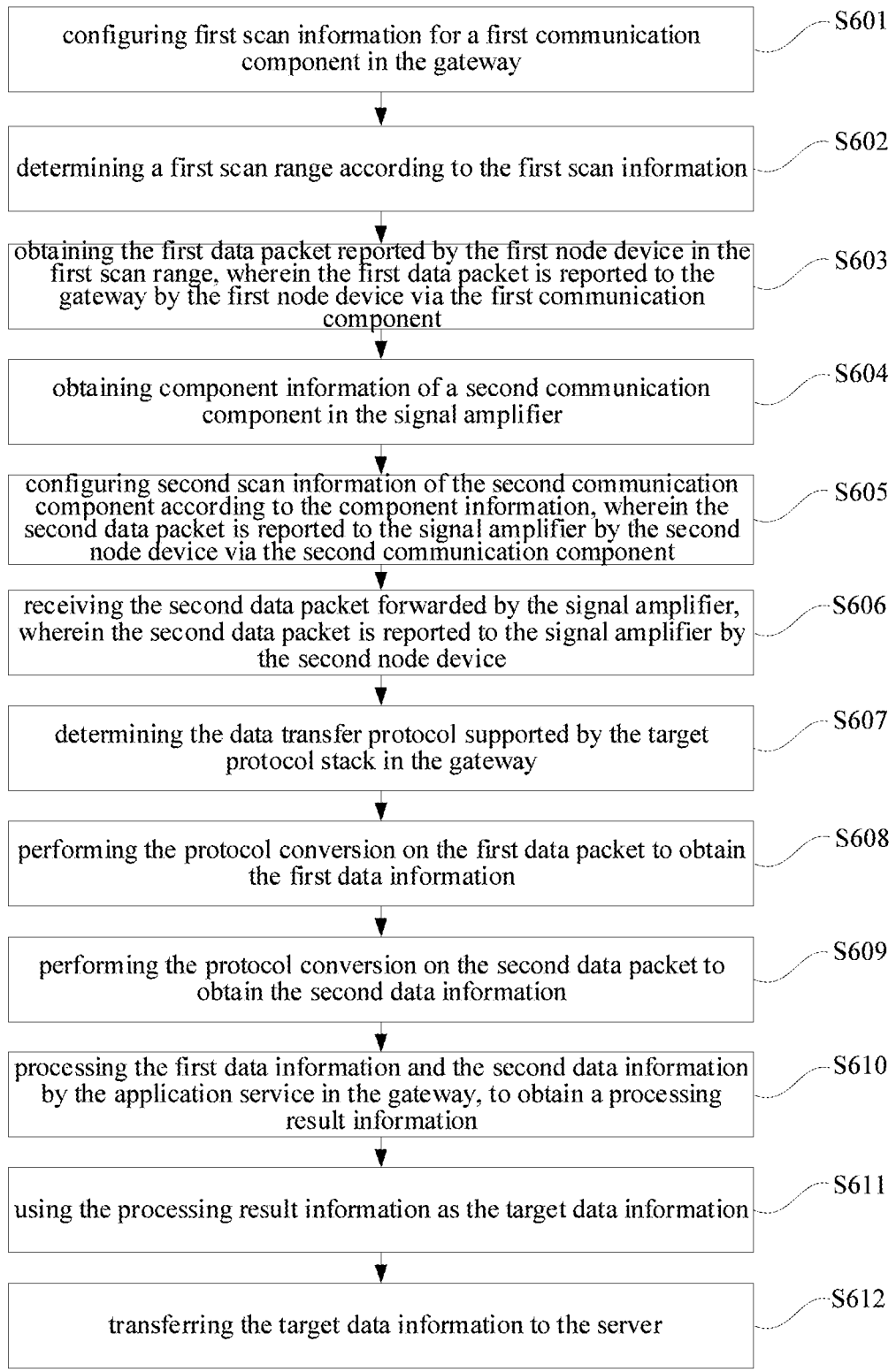
FIG. 6 is a flow chart of the data transfer method according to another embodiment of the present disclosure.

FIG. 6 is a flow chart of the data transfer method according to another embodiment of the present disclosure. The main body of this embodiment can be a gateway, the explanation of the gateway is with reference to the above embodiment, which will not be repeated hereinafter. As illustrated in FIG. 6, the data transfer method includes the following steps:

S601: configuring first scan information for a first communication component in the gateway. The first communication component can be the component integrated in the gateway and configured to connect with the node device and signal amplifier in the communication network, the first communication component can be configured to scan node devices and signal amplifiers within the scope of the gateway itself. If the gateway is a Bluetooth gateway, the first communication component can be an underlying Bluetooth hardware integrated in the Bluetooth gateway, which is the physical hardware that communicates between the Bluetooth gateway and the first node device.

The first scan information refers to the data information that can be used to define the scan range of the gateway in the communication network.

In this embodiment of the present disclosure, when configuring the first scan information for the first communication component in the gateway, the signal coverage data of the gateway can be determined according to the communication parameter information of the gateway, and then the signal coverage of the gateway can be determined in the communication network, to obtain the location information and device identity information of the first node device in the signal coverage. The scan parameters and broadcast parameters of the first communication component are configured according to the location information and device identity information of the first node device, and the configured scan parameters and broadcast parameters are used as the first scan information of the first communication component in the gateway.

S602: determining a first scan range according to the first scan information. The first scan range can refer to the communication network range where located the first node device that the gateway can scan in the communication network.

In this embodiment of the present disclosure, after configuring the first scan information for the first communication component in the gateway, the first scan range can be determined according to the first scan information.

In this embodiment of the present disclosure, when determining the first scan range according to the first scan information, according to the device location information of the first node device configured in the first scan information, positioning processing can be performed in the communication network to determine the device identification of the first node device to be scanned, so as to locate the first node device to be scanned, and the communication network range where located the first node device is used as the first scan range.

S603: obtaining the first data packet reported by the first node device in the first scan range, wherein the first data packet is reported to the gateway by the first node device via the first communication component. In this embodiment of the present disclosure, when obtaining the first data packet reported by the first node device in the first scan range, the first node device can encapsulate the application data and communication interaction data to obtain the first data packet, and then the first node device reports the first data packet to the gateway, the first communication component of the gateway scans and monitors the first node device in the first scan range in real time. After monitoring the first data packet reported by the first node device, the first communication component of the gateway obtains the first data packet reported by the first node device in the first scan range.

S604: obtaining component information of a second communication component in the signal amplifier. The second communication component can be the component integrated in the signal amplifier and configured to establish a communication connection of the node devices in the communication network, the second communication component is the physical hardware that the signal amplifier communicates with the Bluetooth gateway and the second node device, the second node device in the communication network can transfer communication data packet to the signal amplifier via the second communication component of the signal amplifier. If the signal amplifier is a Bluetooth amplifier, then the second communication component can be the underlying Bluetooth hardware integrated in the Bluetooth amplifier.

The component information can refer to data information that describes the connection between the signal amplifier and the gateway and the second node device in the communication network.

In this embodiment of the present disclosure, when obtaining the component information of the second communication component in the signal amplifier, the connection information between the signal amplifier and the gateway and the connection information between the signal amplifier and the second node device can be obtained, and the obtained connection information between the signal amplifier and the gateway and the connection information between the signal amplifier and the second node device can be used as the component information of the second communication component, so as to obtain the component information of the second communication component in the signal amplifier.

S605: configuring second scan information of the second communication component according to the component information, wherein the second data packet is reported to the signal amplifier by the second node device via the second communication component. The second scan information refers to the data information that can be used to define the scan range of the signal amplifier in the communication network. The second communication component can scan the second node device in the communication network according to the second scan information, the second data packet is reported by the second node device to the signal amplifier via the second communication component.

In the embodiment of the present disclosure, after obtaining the component information of the second communication component in the signal amplifier, the second scan information of the second communication component can be configured according to the component information. The second scan information can be used to scan the second node device connected with the signal amplifier in the communication network, the second data packet is reported to the signal amplifier by the second node device via the second communication component.

In the embodiment of the present disclosure, when configuring the second scan information for the second communication component, the communication parameter information of the signal amplifier can be determined, the signal coverage data of the signal amplifier is determined according to the communication parameter information of the signal amplifier, and then the signal coverage of the signal amplifier can be determined in the communication network, to obtain the location information and device identity information of the second node device in the signal coverage. According to the location information and device identity information of the second node device, and the connection information between the signal amplifier and the second node device in the component information, the scan parameters and broadcast parameters of the second communication component are configured, and the configured scan parameters and broadcast parameters are used as the second scan information of the second communication component.

Alternatively, in some embodiments of the present disclosure, when configuring the second scan information for the second communication component, the second scan information can be determined according to the component information, the scan configuration message is generated according to the second scan information, the scan configuration message is transferred to the signal amplifier to enable the signal amplifier to configure the second communication component with the second scan information in response to the scan configuration message, so as to realize the effective communication coverage of the signal amplifier to the second node device within the scan range of the communication network according to the second scan information, so that the second data packet of the second node device can be successfully uploaded to the signal amplifier. Because the signal amplifier can communicate with the gateway, it is ensured that the second data packet can be successfully uploaded to the signal amplifier, ensuring the data path between the second node device and the gateway, and effectively improving the success rate of data transfer.

The scan configuration message refers to the device data information that can be used to configure the scan range of the signal amplifier, this device data information can refer to the device identification information of the second node device that establishes a communication connection with the signal amplifier, which is not limited thereto.

In the embodiment of the present disclosure, when configuring the second scan information for the second communication component, the gateway can determine the scan parameters and broadcast parameters of the second communication component according to the component information, and use the obtained scan parameters and broadcast parameters of the second communication component as the second scan information, and then determine the device identification information of the second node device that establishes the communication connection with the signal amplifier according to the scan parameters and broadcast parameters in the scan information, and set the scan configuration message according to the device identification information of the node device. The Bluetooth gateway transfers the scan configuration message to the signal amplifier. After receiving the scan configuration message, the signal amplifier configures the second communication component with the second scan information in response to the scan configuration message.

S606: receiving the second data packet forwarded by the signal amplifier, wherein the second data packet is reported to the signal amplifier by the second node device.

The description of S606 is with reference to the above embodiment, which will not be repeated hereinafter.

S607: determining the data transfer protocol supported by the target protocol stack in the gateway. The target protocol stack refers to the communication protocol stack integrated in the gateway that can be used for protocol conversion of data. If the gateway is a Bluetooth gateway, the target protocol stack can be the Mesh protocol stack integrated in the Bluetooth gateway. The Mesh protocol stack can be used to parse data packets from the Bluetooth protocol stack. The data transfer protocol supported by the target protocol stack can refer to the data transfer protocol provided by the Mesh protocol stack in the gateway.

In the embodiment of the present disclosure, when determining the data transfer protocol supported by the target protocol stack in the gateway, the function data information, performance information and version information of the target protocol stack integrated in the gateway can be determined, and the data transfer protocol supported by the target protocol stack can be determined according to the obtained data information. When the gateway is a Bluetooth gateway, the performance information and version information of the Mesh protocol stack can be determined, and the data transfer protocol supported by the Mesh protocol stack can be determined according to the performance information and version information of the Mesh protocol stack, and the determined data transfer protocol is used as the data transfer protocol supported by the target protocol stack.

S608: performing the protocol conversion on the first data packet to obtain the first data information. In the embodiment of the present disclosure, after determining the data transfer protocol supported by the target protocol stack in the gateway, the protocol conversion of the first data packet can be performed with the data transfer protocol, to obtain the first data information.

In the embodiment of the present disclosure, when performing the protocol conversion on the first data packet to obtain the first data information, the data transfer protocol can be analyzed to obtain the data transfer unit format specified in the data transfer protocol, a data parse and data format conversion of the first data packet is performed according to the data transfer unit format, to obtain the converted data information and use it as the first data information.

For example, if the gateway is a Bluetooth gateway, when performing the protocol conversion on the first data packet to obtain the first data information, the first data packet can be uploaded to the Mesh protocol stack integrated in the Bluetooth gateway, a data format conversion of the first data packet is performed according to the data transfer unit format specified in the data transfer protocol provided by the Mesh protocol stack, so as to obtain the data information after the format conversion, and use the obtained data information as the first data information.

S609: performing the protocol conversion on the second data packet to obtain the second data information. In the embodiment of the present disclosure, after determining the data transfer protocol supported by the target protocol stack in the gateway, the protocol conversion of the second data packet can be performed with the data transfer protocol, to obtain the second data information.

In the embodiment of the present disclosure, when performing the protocol conversion on the second data packet to obtain the second data information, the data transfer protocol can be analyzed to obtain the data transfer unit format specified in the data transfer protocol, a data parse and data format conversion of the second data packet is performed according to the data transfer unit format, to obtain the converted data information and use it as the second data information.

For example, if the gateway is a Bluetooth gateway, when performing the protocol conversion on the second data packet to obtain the second data information, the second data packet can be uploaded to the Mesh protocol stack integrated in the Bluetooth gateway, a data format conversion of the second data packet is performed according to the data transfer unit format specified in the data transfer protocol provided by the Mesh protocol stack, so as to obtain the data information after the format conversion, and use the obtained data information as the first data information.

In the embodiment of the present disclosure, through determining the data transfer protocol supported by the target protocol stack in the gateway, performing the protocol conversion on the first data packet to obtain the first data information, performing the protocol conversion on the second data packet to obtain the second data information, so as to perform the protocol conversion on the first and second data packets according to the data transfer protocol supported by the target protocol stack, the correctness of data protocol conversion is ensured, enabling the subsequent application data processing and effectively improving the stability of data transfer.

S610: processing the first data information and the second data information by the application service in the gateway, to obtain a processing result information. The processing result information refers to the data information obtained after the application data processing of the first data information and the second data information.

The application service in the gateway can be configured to process the first data information and the second data information after the protocol conversion processing. The application service processes the first data information and the second data information according to the corresponding application data processing logic, to obtain the processing result information.

In the embodiment of the present disclosure, after performing the protocol conversion on the first data packet to obtain the first data information and performing the protocol conversion on the second data packet to obtain the second data information, the first data information and the second data information can be processed by the application service in the gateway to obtain the processing result information.

In the embodiment of the present disclosure, when processing the first data packet and the second data packet by the application service in the gateway to obtain the processing result information, the data application service type of the first data information and the second data information can be determined, the data processing logic of the application service in the gateway is determined according to the data application service type, and then the application service in the gateway can process the first data information and the second data information according to the corresponding application processing logic. For example, a logic calculation of the first data information and the second data information is performed, and the calculated data information is encapsulated, to obtain the processed data information, and use the obtained data information as the target data information.

S611: using the processing result information as the target data information. In the embodiment of the present disclosure, after processing the first data information and the second data information by the application service in the gateway to obtain the processing result information, the processing result information can be used as the target data information, and then the gateway can transfer the target data information to the server, so as to realize the data communication between the node device and the server in the communication network.

S612: transferring the target data information to the server. The description of S612 is with reference to the above embodiment, which will not be repeated hereinafter.

In this embodiment of the present disclosure, through obtaining the first data packet reported by the first node device and receiving the second data packet forwarded by the signal amplifier, wherein the second data packet is reported by the second node device to the signal amplifier, and processing the first data packet and the second data packet to obtain the target data information, and transferring the target data information to the server, the joint gateway and signal amplifier are realized to effectively cover the signals of multiple node devices, which can effectively ensure the consistency effect of data transfer, and improve the data transfer stability and transfer performance. When configuring the second scan information for the second communication component according to the component information, the second scan information can be determined according to the component information, the scan configuration message is generated according to the second scan information, the scan configuration message is transferred to the signal amplifier, so that the signal amplifier configures the second communication component with the second scan information in response to the scan configuration message, so that the effective communication coverage of the signal amplifier to the second node device within the scan range of the communication network can be realized according to the second scan information. Thus, the second data packet of the second node device can be successfully uploaded to the signal amplifier. Because the signal amplifier can communicate with the gateway to ensure that the second data packet can be successfully uploaded to the signal amplifier, the data path between the second node device and the gateway is ensured, effectively improving the success rate of data transfer. Through determining the data transfer protocol supported by the target protocol stack in the gateway, performing the protocol conversion on the first data packet to obtain the first data information, performing the protocol conversion on the second data packet to obtain the second data information, so as to perform the protocol conversion on the first and second data packets according to the data transfer protocol supported by the target protocol stack, the correctness of data protocol conversion is ensured, enabling the subsequent application data processing and effectively improving the stability of data transfer.

Figure 7:
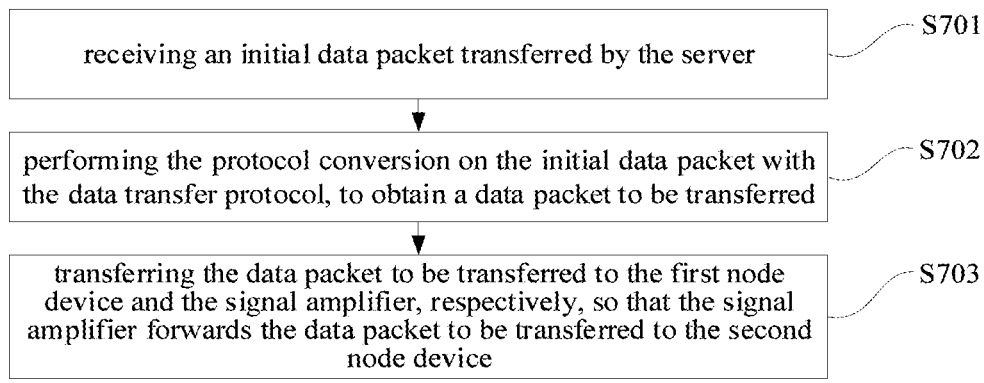
FIG. 7 is a flow chart of the data transfer method according to another embodiment of the present disclosure.

FIG. 7 is a flow chart of the data transfer method according to another embodiment of the present disclosure. The main body of this embodiment can be a gateway, the explanation of the gateway is with reference to the above embodiment, which will not be repeated hereinafter. As illustrated in FIG. 7, the data transfer method includes the following steps.

S701: receiving an initial data packet transferred by the server. The initial data packet refers to the original data packet sent by the server without protocol conversion. The initial data packet can contain the control message of the server.

In the embodiment of the present disclosure, when receiving the initial data packet transferred by the server, the server can convert the control instruction of the node device in the communication network into the control message, and encapsulate the control message to obtain the communication data packet of the server, and use the communication data packet as the initial data packet, and then the gateway can receive the initial data packet transferred by the server.

S702: performing the protocol conversion on the initial data packet with the data transfer protocol, to obtain a data packet to be transferred. The data packet to be transferred is the data packet to be transferred of the node device. The data packet to be transferred is the data packet obtained after the protocol conversion of the initial data packet with the data transfer protocol.

In the embodiment of the present disclosure, after receiving the initial data packet transferred by the server, the protocol conversion of the initial data packet with the data transfer protocol is performed to obtain the data packet to be transferred.

In the embodiment of the present disclosure, when performing the protocol conversion on the initial data packet with the data transfer protocol to obtain the data packet to be transferred, the gateway can parse the initial data packet and convert the control message in the initial data packet into the data of Mesh message structure, and then perform a protocol conversion on the data of Mesh message structure to protocol, and re-encapsulate the processed data to obtain the corresponding communication data packet, and use the communication data packet as the data packet to be transferred.

For example, if the gateway is a Bluetooth gateway, the initial data packet can be sent to the Mesh protocol stack of the gateway for processing, the Mesh data packet parses the initial data packet according to the data transfer protocol which it supports, so as to perform protocol conversion on the initial data packet, and then encapsulates the data after protocol conversion, to obtain the encapsulated data packet, and use the encapsulated data packet as the data packet to be transferred.

S703: transferring the data packet to be transferred to the first node device and the signal amplifier, respectively, so that the signal amplifier forwards the data packet to be transferred to the second node device. In the embodiment of the present disclosure, after performing the protocol conversion on the initial data packet with the data transfer protocol to obtain the data packet to be transferred, the data packets to be transferred are transferred respectively to the first node device and the signal amplifier.

In the embodiment of the present disclosure, when transferring respectively the data packet to be transferred to the first node device and the signal amplifier, the forwarding module integrated in the gateway can transfer respectively the data packets to be transferred to the first node device and the signal amplifier via the underlying Bluetooth hardware. After the signal amplifier receives the data packets to be transferred from the gateway, the underlying Bluetooth hardware of the signal amplifier forwards the data packets to be transferred to the second node device.

In other embodiments of the present disclosure, after receiving the data packets to be transferred, the received multiple data packets to be transferred are de duplicated according to the source address information in the data packet to be transferred, and then execute the application message in the data packets to be transferred.

In the embodiment of the present disclosure, through receiving the initial data packet transferred by the server, performing the protocol conversion on the initial data packet with the data transfer protocol to obtain the data packet to be transferred, and transferring the data packet to be transferred to the first node device and the signal amplifier, respectively, so that the signal amplifier forwards the data packet to be transferred to the second node device, the signal amplifier can be applied to realize the signal coverage of the node device in the communication network, ensuring that the control message of the server can be successfully transmitted to the node device. Since the signal amplifier has no limitation on the version of the communication protocol, it can improve the consistency of the data transfer process and effectively improve the data transfer performance.

Figure 8:
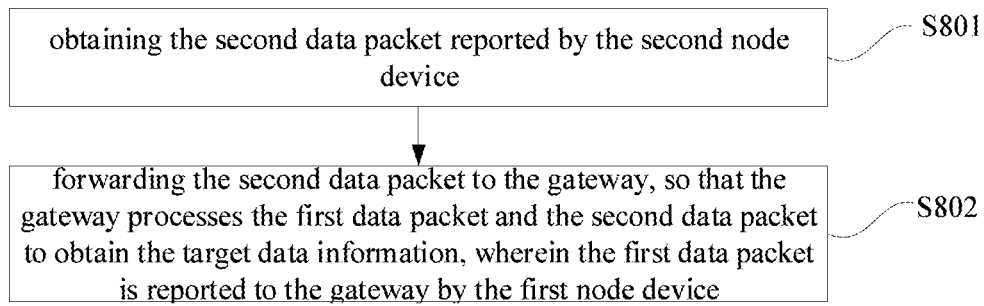
FIG. 8 is a flow chart of the data transfer method according to another embodiment of the present disclosure.

FIG. 8 is a flow chart of the data transfer method according to another embodiment of the present disclosure. This embodiment may be implemented by the signal amplifier in the communication network, the signal amplifier is a communication device that can expand the signal range of the gateway in the communication network. In the Bluetooth communication network, the signal amplifier, for example, can be a Bluetooth signal amplifier. The Bluetooth signal amplifier can relay data transmission between the Bluetooth gateway and the node device, that is, the data at the Bluetooth gateway is transferred to the node device, and the data at the node device is transferred to the Bluetooth gateway, so as to trigger the Bluetooth gateway to transfer data to the server.

In the embodiment of the present disclosure, the signal amplifier can be, for example, a Bluetooth signal amplifier.

As illustrated in FIG. 8, the data transfer method includes the following steps.

S801: obtaining the second data packet reported by the second node device. In the embodiment of the present disclosure, when obtaining the second data packet reported by the second node device, the second node device can report the communication data packet, the underlying Bluetooth hardware of the signal amplifier can obtain the second data packet reported by the second node device.

S802: forwarding the second data packet to the gateway, so that the gateway processes the first data packet and the second data packet to obtain the target data information, wherein the first data packet is reported to the gateway by the first node device. In the embodiment of the present disclosure, after obtaining the second data packet reported by the second node device, the second data packet can be forwarded to the gateway, so that the gateway processes the first data packet and the second data packet to obtain the target data information.

In the embodiment of the present disclosure, the second data packet reported by the second node device can be obtained by the signal amplifier, and then the signal amplifier can forward the second data packet to the gateway. The gateway can receive the first data packet reported by the first node device in the communication network. After receiving the first data packet and the second data packet, the gateway can perform protocol conversion on the first data packet and the second data packet to obtain the first data information and the second data information, and then the Bluetooth application service of the gateway can process the first data information and the second data information to obtain the target data information.

In this embodiment, through obtaining the second data packet reported by the second node device and forwarding the second data packet to the gateway, so that the gateway processes the first data packet and the second data packet to obtain the target data information, wherein the first data packet is reported to the gateway by the first node device, the joint gateway and signal amplifier are realized to effectively cover the signals of multiple node devices, which can effectively ensure the consistency effect of data transfer, and improve the data transfer stability and transfer performance.

Figure 9:
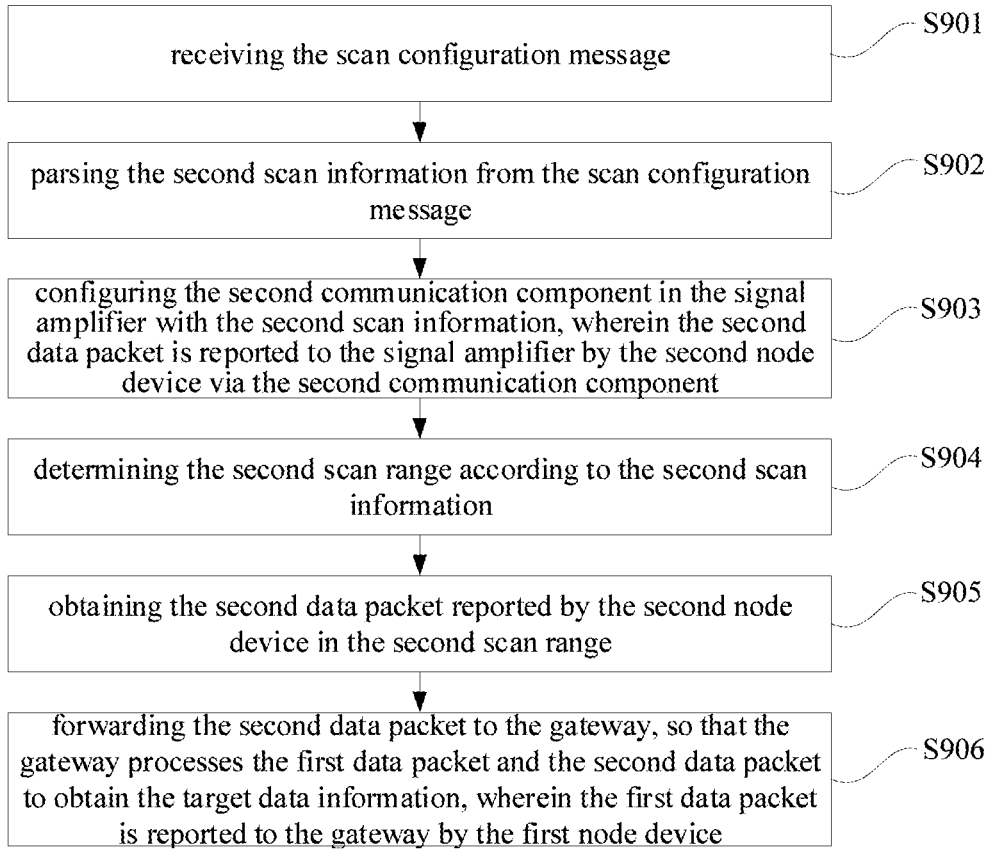
FIG. 9 is a flow chart of the data transfer method according to another embodiment of the present disclosure.

FIG. 9 is a flow chart of the data transfer method according to another embodiment of the present disclosure. The execution subject of this embodiment can be a signal amplifier, the explanation of the signal amplifier is with reference to the above embodiment, which will not be repeated hereinafter. As illustrated in FIG. 9, the data transfer method includes the following steps.

S901: receiving the scan configuration message. The scan configuration message refers to the data information configured by the gateway that can be used to define the scan range of the signal amplifier.

In the embodiments of the present disclosure, the gateway can define the scan range of the signal amplifier, and configure the scan configuration message of the signal amplifier according to the defined scan range, and then the scan configuration message can be transferred to the signal amplifier, the signal amplifier receives the scan configuration message.

S902: parsing the second scan information from the scan configuration message. In the embodiments of the present disclosure, after receiving the scan configuration message, the second scan information can be parsed from the scan configuration message.

In the embodiments of the present disclosure, when parsing the second scan information from the scan configuration message, the scan range defined in the scan configuration message can be parsed to obtain the device identification information of the second node device within the scanning range, and the parsed device identification message is used to parse the second scan information from the scan configuration message.

S903: configuring the second communication component in the signal amplifier with the second scan information, wherein the second data packet is reported to the signal amplifier by the second node device via the second communication component. The second communication component can be the component integrated in the signal amplifier and configured to establish a communication connection of the node devices in the communication network, the second communication component is the physical hardware that the signal amplifier communicates with the Bluetooth gateway and the second node device, the second node device in the communication network can transfer communication data packet to the signal amplifier via the second communication component of the signal amplifier. If the signal amplifier is a Bluetooth amplifier, then the second communication component can be the underlying Bluetooth hardware integrated in the Bluetooth amplifier.

In the embodiment of the present disclosure, after parsing the second scan information from the scan configuration message, the second communication component in the signal amplifier can be configured with the second scan information.

In the embodiment of the present disclosure, when configuring the second communication component in the signal amplifier with the second scan information, the second communication component in the signal amplifier can be configured according to the device identification configuration of the second node device in the second scan information, and then the second node device in the communication network can be scanned, and the second communication component receives the second data packet uploaded by the second node device so as to upload the second data packet to the signal amplifier.

In the embodiment of the present disclosure, through receiving the scan configuration message, parsing the second scan information from the scan configuration message, and configuring the second communication component in the signal amplifier with the second scan information, the scan range of the signal amplifier can be configured to realize the effective coverage of the signal amplifier to the node device in the communication network, and ensure the stability of data transfer between the node device and the server.

S904: determining the second scan range according to the second scan information. In the embodiment of the present disclosure, after configuring the second communication component in the signal amplifier with the second scan information, the second scan range can be determined according to the second scan information.

In the embodiment of the present disclosure, when determining the second scan range according to the second scan information, the second node device in the communication network can be located according to the device identification of the second node device in the second scan information, and the communication network range where located the second node device is used as the second scan range, so as to determine the second scan range according to the second scan information.

S905: obtaining the second data packet reported by the second node device in the second scan range. In the embodiment of the present disclosure, when obtaining the second data packet reported by the second node device in the second scan range, the second node device in the second scan range can be scanned, and the second data packet reported by the second node device in the second scan range can be obtained by the second communication component of the signal amplifier.

S906: forwarding the second data packet to the gateway, so that the gateway processes the first data packet and the second data packet to obtain the target data information, wherein the first data packet is reported to the gateway by the first node device. The description of S906 is with reference to the above embodiment, which will not be repeated hereinafter.

In this embodiment, through obtaining the second data packet reported by the second node device, forwarding the second data packet to the gateway, so that the gateway processes the first data packet and the second data packet to obtain the target data information, wherein the first data packet is reported to the gateway by the first node device, the joint gateway and signal amplifier are realized to effectively cover the signals of multiple node devices, which can effectively ensure the consistency effect of data transfer, and improve the data transfer stability and transfer performance. Through receiving the scan configuration message, parsing the second scan information from the scanning configuration message, and configuring the second communication component in the signal amplifier with the second scanning information, the scan range of the signal amplifier can be configured to realize the effective coverage of the signal amplifier to the node device in the communication network, and ensure the stability of data transfer between the node device and the server.

Figure 10:
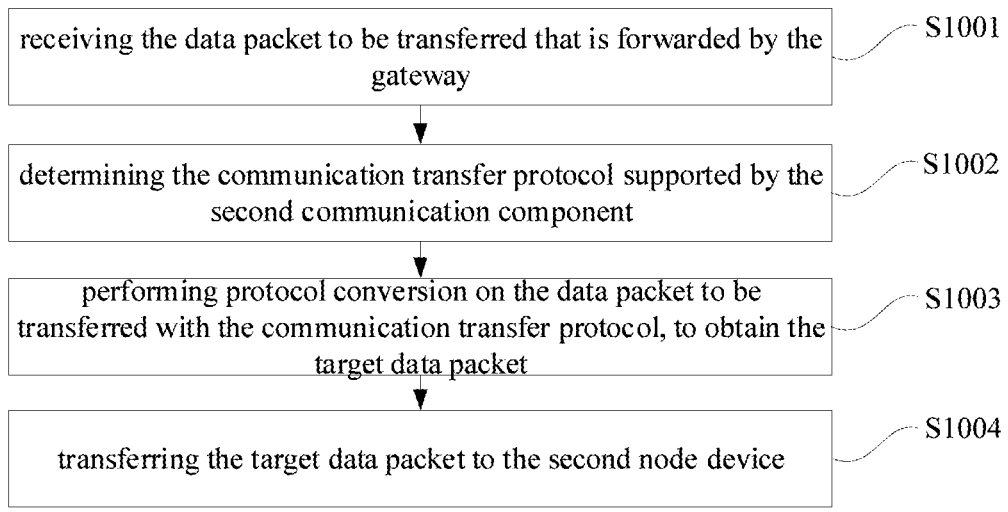
FIG. 10 is a flow chart of the data transfer method according to another embodiment of the present disclosure.

FIG. 10 is a flow chart of the data transfer method according to another embodiment of the present disclosure. The execution subject of this embodiment can be a signal amplifier, the explanation of the signal amplifier is with reference to the above embodiment, which will not be repeated hereinafter. As illustrated in FIG. 10, the data transfer method includes the following steps.

S1001: receiving the data packet to be transferred that is forwarded by the gateway. The data packet to be transferred is the data packet obtained after the protocol conversion of the initial data packet, after the gateway receives the initial data packet transferred by the server. The protocol conversion can be, for example, the data format conversion of the initial data packet according to the communication transfer protocol.

In the embodiment of the present disclosure, when receiving the data packet to be transferred that is forwarded by the gateway, the gateway can receive the initial data packet transferred by the server, and convert the initial data packet with the data transmission protocol to obtain the data packet to be transferred, and then the forwarding module in the gateway forwards the data packet to be transferred to the Bluetooth amplifier via the underlying Bluetooth hardware, and the Bluetooth amplifier receives the data packet to be transferred through the underlying Bluetooth hardware.

S1002: determining the communication transfer protocol supported by the second communication component. The communication transfer protocol supported by the second communication component refers to the communication transfer protocol supported by the underlying Bluetooth hardware of the signal amplifier, which can describe the data transfer format supported by the second communication component when transferring data.

In the embodiment of the present disclosure, after receiving the data packet to be transferred that is forwarded by the gateway, the communication transfer protocol supported by the second communication component can be determined.

S1003: performing protocol conversion on the data packet to be transferred with the communication transfer protocol, to obtain the target data packet.

In the embodiment of the present disclosure, after determining the communication transfer protocol supported by the second communication component, the protocol conversion of the data packet to be transferred can be performed with the communication transfer protocol, to obtain the target data packet.

In the embodiment of the present disclosure, when performing protocol conversion on the data packet to be transferred with the communication transfer protocol to obtain the target data packet, a data format conversion of the data packet to be transferred is performed according to the data transfer unit format specified in the communication transfer protocol, and the processed data packet is used as the target data packet.

S1004: transferring the target data packet to the second node device. In the embodiment of the present disclosure, after performing protocol conversion on the data packet to be transferred with the communication transfer protocol to obtain the target data packet, the target data packet can be transferred to the second node device by the Bluetooth amplifier. After the second node device receives the target data packet, the multiple target data packets can be de duplicated, in order to obtain the final target data packet, and then execute the application message in the final target data packet.

In this embodiment, through receiving the data packet to be transferred that is forwarded by the gateway, determining the communication transfer protocol supported by the second communication component, performing protocol conversion on the data packet to be transferred with the communication transfer protocol to obtain the target data packet, and transferring the target data packet to the second node device, the signal amplifier can be used to realize the downlink data transfer between the server and the node device, so as to ensure the bidirectional data transmission between the node device and the server.

Figure 11:
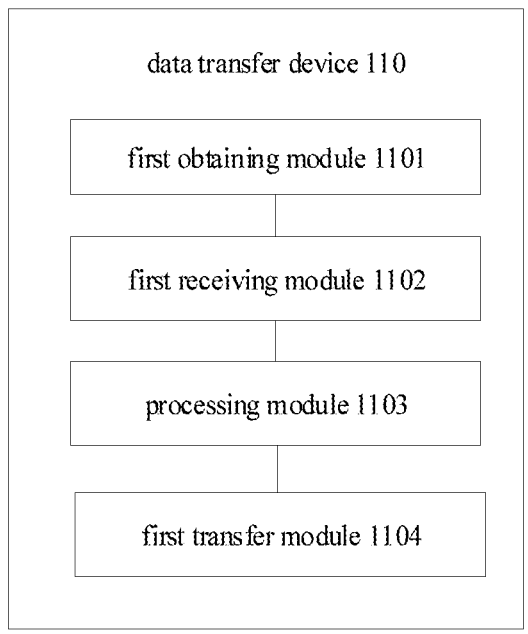
FIG. 11 is a schematic diagram of the data transfer device according to an embodiment of the present disclosure.

FIG. 11 is a schematic diagram of the data transfer device according to an embodiment of the present disclosure. This embodiment is applied to the gateway. As illustrated in FIG. 11, the data transfer device 110 can include a first obtaining module 1101, configured to obtain a first data packet reported by a first node device, and a first receiving module 1102, configured to receive a second data packet forwarded by a signal amplifier, wherein the second data packet is reported to the signal amplifier by a second node device. The data transfer device 110 can further include a processing module 1103 configured to process the first and second data packets to obtain target data information, and a first transfer module 1104 configured to transfer the target data information to a server.

Figure 12:
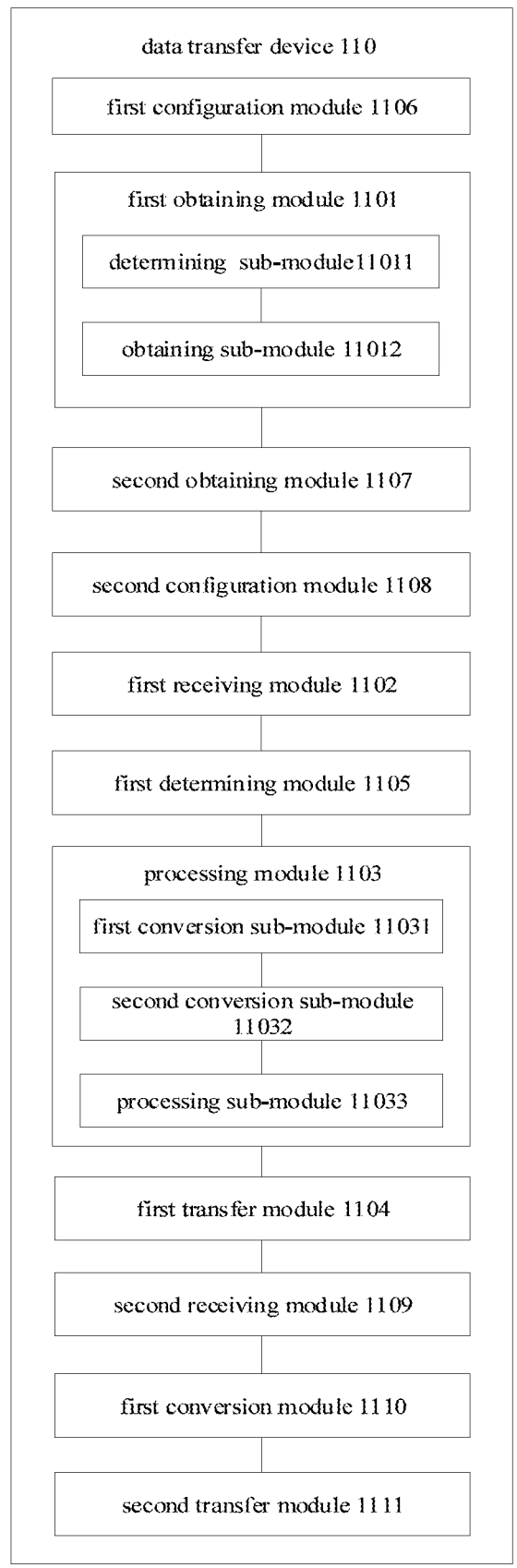
FIG. 12 is a schematic diagram of the data transfer device according to another embodiment of the present disclosure.

In some embodiments of the present disclosure, as illustrated in FIG. 12, which is a schematic diagram of the data transfer device according to another embodiment of the present disclosure, the processing module 1103 includes:

a first conversion sub-module 11031, configured to perform a protocol conversion on the first data packet to obtain first data information;

a second conversion sub-module 11032, configured to perform the protocol conversion on the second data packet to obtain second data information;

a processing sub-module 11033, configured to process the first data information and the second data information to obtain the target data information.

In some embodiments of the present disclosure, further includes:

a first determining module 1105, configured to determine a data transfer protocol supported by a target protocol stack in a gateway;

wherein the first conversion sub-module 11031 is further configured to:

perform the protocol conversion on the first data packet to obtain the first data information;

wherein the second conversion sub-module 11032 is further configured to:

perform the protocol conversion on the second data packet to obtain the second data information.

In some embodiments of the present disclosure, wherein the processing sub-module 11033 is further configured to:

process the first data information and the second data information by an application service in the gateway, to obtain a processing result information;

use the processing result information as the target data information.

In some embodiments of the present disclosure, further includes:

a first configuration module 1106, configured to configure first scan information for a first communication component in the gateway, before obtaining the first data packet reported by the first node device;

wherein the first obtaining module 1101 includes:

a determining sub-module 11011, configured to determine a first scan range according to the first scan information;

an obtaining sub-module 11012, configured to obtain the first data packet reported by the first node device in the first scan range, wherein the first data packet is reported to the gateway by the first node device via the first communication component.

In some embodiments of the present disclosure, further includes:

a second obtaining module 1107, configured to obtain component information of a second communication component in the signal amplifier, before receiving the second data packet forwarded by the signal amplifier;

a second configuration module 1108, configured to configure second scan information of the second communication component according to the component information, wherein the second data packet is reported to the signal amplifier by the second node device via the second communication component.

In some embodiments of the present disclosure, wherein the second configuration module 1108 is further configured to:

determine the second scan information according to the component information;

generate a scan configuration message according to the second scan information;

transfer the scan configuration message to the signal amplifier, so that the signal amplifier configures the second communication component with the second scan information in response to the scan configuration message.

In some embodiments of the present disclosure, further includes:

a second receiving module 1109, configured to receive an initial data packet transferred by the server;

a first conversion module 1110, configured to perform the protocol conversion on the initial data packet with the data transfer protocol, to obtain a data packet to be transferred;

a second transfer module 1111, configured to transfer the data packet to be transferred to the first node device and the signal amplifier, respectively, so that the signal amplifier forwards the data packet to be transferred to the second node device.

Corresponding to the data transfer method provided by the embodiments of FIGS. 1 to 7 above, the present disclosure also provides a data transfer device. Since the data transfer device provided by the embodiments of the present disclosure corresponds to the data transfer method provided by the embodiments of FIGS. 1 to 7 above, the implementation of the data transfer method can be also applied to the data transfer device provided by the embodiments of the present disclosure, which will not be described in detail in the embodiments of the present disclosure.

In the embodiments, through obtaining the first data packet reported by the first node device and receiving the second data packet forwarded by the signal amplifier, wherein the second data packet is reported by the second node device to the signal amplifier, and processing the first data packet and the second data packet to obtain the target data information, and transferring the target data information to the server, the joint gateway and signal amplifier are realized to effectively cover the signals of multiple node devices, which can effectively ensure the consistency effect of data transfer, and improve the data transfer stability and transfer performance.

Figure 13:
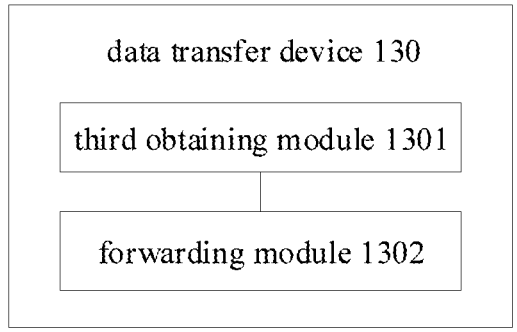
FIG. 13 is a schematic diagram of the data transfer device according to another embodiment of the present disclosure.

FIG. 13 is a schematic diagram of the data transfer device according to another embodiment of the present disclosure. This embodiment is applied to the signal amplifier. As illustrated in FIG. 13, the data transfer device 130 can include: a third obtaining module 1301, configured to obtain a second data packet reported by a second node device; and a forwarding module 1302, configured to forward the second data packet to a gateway, so that the gateway processes a first data packet and the second data packet to obtain target data information, wherein the first data packet is reported to the gateway by a first node device.

Figure 14:
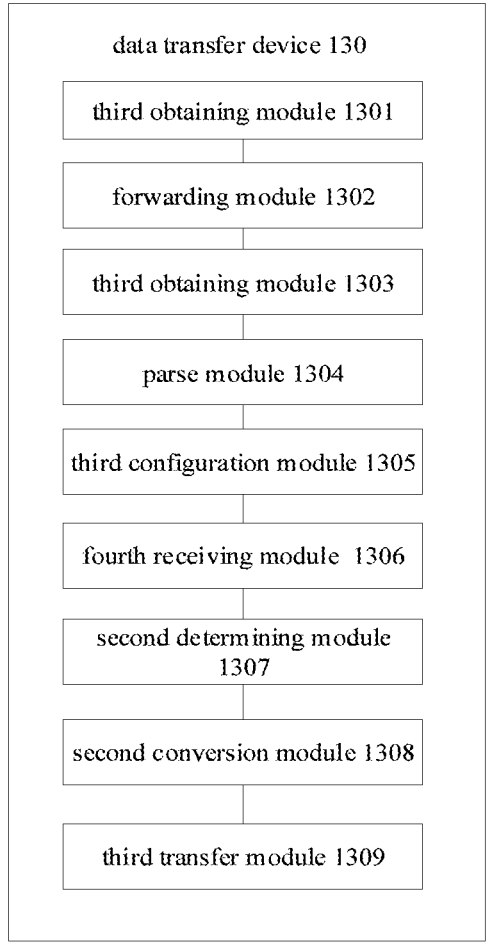
FIG. 14 is a schematic diagram of the data transfer device according to another embodiment of the present disclosure.

In some embodiments of the present disclosure, as illustrated in FIG. 14 which is a schematic diagram of the data transfer device according to another embodiment of the present disclosure, this data transfer device includes:

a third obtaining module 1303, configured to receive a scan configuration message before obtaining the second data packet reported by the second node device, a parse module 1304, configured to parse second scan information from the scan configuration message; and a third configuration module 1305, configured to configure a second communication component in a signal amplifier with the second scan information, wherein the second data packet is reported to the signal amplifier by the second node device via the second communication component.

In some embodiments of the present disclosure, wherein the third obtaining module 1301 is further configured to determine a second scan range according to the second scan information, and obtain the second data packet reported by the second node device in the second scan range.

In some embodiments of the present disclosure, further including:
- a fourth receiving module 1306, configured to receive a data packet to be transferred forwarded by the gateway;
- a second determining module 1307, configured to determine a communication transfer protocol supported by the second communication component;
- a second conversion module 1308, configured to perform a protocol conversion on the data packet to be transferred with the communication transfer protocol, to obtain a target data packet; and
- a third transfer module 1309, configured to transfer the target data packet to the second node device.

Corresponding to the data transfer method provided by the embodiments of FIGS. 8 to 10 above, the present disclosure also provides a data transfer device. Since the data transfer device provided by the embodiments of the present disclosure corresponds to the data transfer method provided by the embodiments of FIGS. 8 to 10 above, the implementation of the data transfer method can be also applied to the data transfer device provided by the embodiments of the present disclosure, which will not be described in detail in the embodiments of the present disclosure.

In this embodiment, through obtaining the second data packet reported by the second node device and forwarding the second data packet to the gateway, so that the gateway processes the first data packet and the second data packet to obtain the target data information, wherein the first data packet is reported to the gateway by the first node device, the joint gateway and signal amplifier are realized to effectively cover the signals of multiple node devices, which can effectively ensure the consistency effect of data transfer, and improve the data transfer stability and transfer performance.

Figure 15:
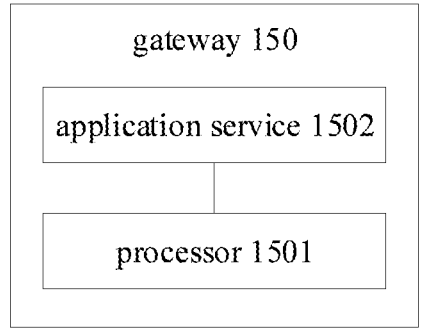
FIG. 15 is a schematic diagram of the gateway according to an embodiment of the present disclosure.

In order to implement the above embodiments, the present disclosure also proposes a gateway 150, as illustrated in FIG. 15, which is a schematic diagram of the gateway according to an embodiment of the present disclosure, this gateway includes:
- a processor 1501, configured to obtain a first data packet reported by a first node device and receive a second data packet forwarded by a signal amplifier, and provide the first data packet and the second data packet to an application service 1502, wherein the second data packet is reported to the signal amplifier by a second node device;
- the application service 1502, configured to process the first data packet and the second data packet to obtain target data information, and transfer the target data information to a server.

Figure 16:
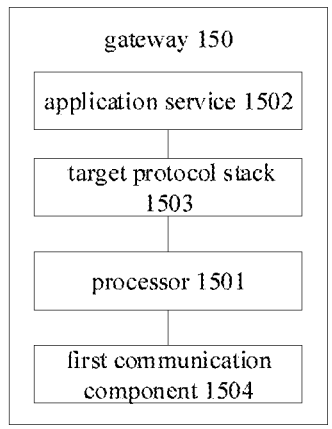
FIG. 16 is a schematic diagram of the gateway according to another embodiment of the present disclosure.

In some embodiments of the present disclosure, as illustrated in FIG. 16, which is a schematic diagram of the signal amplifier according to another embodiment of the present disclosure, this gateway includes:
- a target protocol stack 1503, configured to provide a data transfer protocol;
- wherein the processor 1501 is further configured to perform a protocol conversion on the first data packet with the data transfer protocol to obtain the first data information, perform the protocol conversion on the second data packet with the data transfer protocol to obtain the second data information, and provide the first data information and the second data information to the application service 1502;

wherein the application service 1502 is further configured to process the first data information and the second data information to obtain the target data information.

In some embodiments of the present disclosure, wherein, the application service 1502 is further configured to process the first data information and the second data information to obtain a processing result information, and use the processing result information as the target data information.

In some embodiments of the present disclosure, wherein, the processor 1501 is further configured to configure first scan information for a first communication component 1504 in the gateway, before obtaining the first data packet reported by the first node device, wherein the first scan information indicates a first scan range; wherein the gateway 150 further includes the first communication component 1504 is further configured to obtain the first data packet reported by the first node device in the first scan range, and forward the first data packet to the processor 1501.

In some embodiments of the present disclosure, wherein, the processor 1501 is further configured to obtain component information of the second communication component in the signal amplifier, and configure second scan information of the second communication component according to the component information, wherein the second data packet is reported to the signal amplifier by the second node device via the second communication component.

In some embodiments of the present disclosure, wherein, the processor 1501 is further configured to determine the second scan information according to the component information, generate a scan configuration message according to the second scan information, and transfer the scan configuration message to the signal amplifier, so that the signal amplifier configures the second communication component with the second scan information in response to the scan configuration message.

In some embodiments of the present disclosure, wherein, the application service 1501 is further configured to receive an initial data packet transferred by the server, perform the protocol conversion on the initial data packet with the data transfer protocol, obtain a data packet to be transferred, and transfer the data packet to be transferred to the first node device and the signal amplifier, respectively, so that the signal amplifier forwards the data packet to be transferred to the second node device.

Corresponding to the data transfer method provided by the embodiments of FIGS. 1 to 7 above, the present disclosure also provides a gateway. Since the gateway provided by the embodiments of the present disclosure corresponds to the data transfer method provided by the embodiments of FIGS. 1 to 7 above, the implementation of the data transfer method can be also applied to the gateway provided by the embodiments of the present disclosure, which will not be described in detail in the embodiments of the present disclosure.

In this embodiment, through obtaining the first data packet reported by the first node device and receiving the second data packet forwarded by the signal amplifier, providing the first data packet and the second data packet to the application service, wherein the second data packet is reported to the signal amplifier by the second node device, processing the first data packet and the second data packet to obtain the target data information, and transferring the target data information to the server, the joint gateway and signal amplifier are realized to effectively cover the signals of multiple node devices, which can effectively ensure the consistency effect of data transfer, and improve the data transfer stability and transfer performance.

Figure 17:
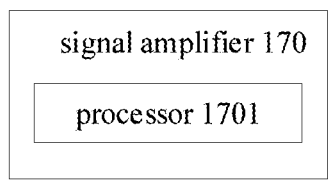
FIG. 17 is a schematic diagram of the signal amplifier according to an embodiment of the present disclosure.

In order to implement the above embodiments, the present disclosure also proposes a signal amplifier 170, as illustrated in FIG. 17, which is a schematic diagram of the signal amplifier according to another embodiment of the present disclosure, this signal amplifier includes: a processor 1701, configured to obtain a second data packet reported by a second node device, and forward the second data packet to a gateway, so that the gateway processes a first data packet and the second data packet to obtain target data information, wherein the first data packet is reported to the gateway by a first node device.

Figure 18:
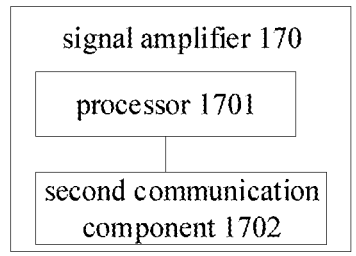
FIG. 18 is a schematic diagram of the signal amplifier according to another embodiment of the present disclosure.

In some embodiments of the present disclosure, as illustrated in FIG. 18, which is a schematic diagram of the signal amplifier according to another embodiment of the present disclosure, this signal amplifier includes: a second communication component 1702, configured to obtain the second data packet reported by the second node device, and transfer the second data packet to the processor 1701.

In some embodiments of the present disclosure, wherein, the second communication component 1701 is further configured to receive a scan configuration message before obtaining the second data packet reported by the second node device, parse second scan information from the scan configuration message, and configure the second communication component with the second scan information; and the second communication component 1702 is further configured to determine a second scan range according to the second scan information, and obtain the second data packet reported by the second node device in the second scan range.

In some embodiments of the present disclosure, wherein, the processor 1701 is further configured to receive a data packet to be transferred forwarded by the gateway, determine a communication transfer protocol supported by the second communication component, perform a protocol conversion on the data packet to be transferred with the communication transfer protocol to obtain a target data packet, and transfer the target data packet to the second node device.

Corresponding to the data transfer method provided by the embodiments of FIGS. 8 to 10 above, the present disclosure also provides a signal amplifier. Since the signal amplifier provided by the embodiments of the present disclosure corresponds to the data transfer method provided by the embodiments of FIGS. 8 to 10 above, the implementation of the data transfer method can be also applied to the signal amplifier provided by the embodiments of the present disclosure, which will not be described in detail in the embodiments of the present disclosure.

In this embodiment, through obtaining the second data packet reported by the second node device and forwarding the second data packet to the gateway, so that the gateway processes the first data packet and the second data packet to obtain the target data information, wherein the first data packet is reported to the gateway by the first node device, the joint gateway and signal amplifier are realized to effectively cover the signals of multiple node devices, which can effectively ensure the consistency effect of data transfer, and improve the data transfer stability and transfer performance.

Figure 19:
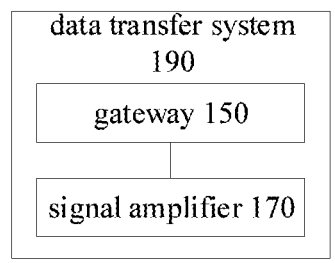
FIG. 19 is a schematic diagram of the data transfer system according to an embodiment of the present disclosure.

In order to implement the above embodiments, the present disclosure also proposes a data transfer system 190, as illustrated in FIG. 19, which is a schematic diagram of the data transfer system according to an embodiment of the present disclosure, this data transfer system includes: a gateway 150 according to above embodiments; and a signal amplifier 170 according to above embodiments.

Corresponding to the data transfer method provided by the embodiments of FIGS. 1 to 10 above, the present disclosure also provides a data transfer system. Since the data transfer system provided by the embodiments of the present disclosure corresponds to the data transfer method provided by the embodiments of FIGS. 1 to 10 above, the implementation of the data transfer method can be also applied to the data transfer system provided by the embodiments of the present disclosure, which will not be described in detail in the embodiments of the present disclosure.

In this embodiment, the signal amplifier obtains the second data packet reported by the second node device and forwards the second data packet to the gateway, the gateway obtains the first data packet reported by the first node device and receives the second data packet forwarded by the signal amplifier, and then provides the first data packet and the second data packet to the application service, processes the first data packet and the second data packet to obtain the target data information, and transfers the target data information to the server, the joint gateway and signal amplifier are realized to effectively cover the signals of multiple node devices, which can effectively ensure the consistency effect of data transfer, and improve the data transfer stability and transfer performance.

In order to implement the above embodiments, the present disclosure also proposes a non-transitory computer readable storage medium, on which a computer program is stored, the program is executed by a processor to implement the data transfer method according to the above embodiments of the present disclosure.

In order to implement the above embodiments, the present disclosure also proposes a computer program product, when instructions in the computer program product is executed by the processor, the data transfer method according to the above embodiments of the present disclosure is implemented.

After considering the disclosure disclosed herein in the specification and practice, it is easy for those skilled in the art to think of other embodiments of the disclosure. The present disclosure is intended to cover any variation, use or adaptation of the present disclosure, which follows the general principles of the present disclosure and includes common general knowledge or frequently used technical means in the technical field not disclosed in the present disclosure. The description and the embodiments are only regarded as exemplary, and the true scope and spirit of the present disclosure are indicated by the following claims.

It should be understood that the present disclosure is not limited to the precise structure described above and shown in the drawings, and various modifications and changes may be made without departing from its scope. The scope of this disclosure is limited only by the appended claims.

It should be noted that in the description of the present disclosure, the terms "first", "second" and the like are only used for descriptive purposes and cannot be understood as indicating or implying relative importance. In addition, in the description of the present disclosure, unless otherwise specified, "multiple" means two or more.

Any process or method description in the flowchart or otherwise described herein can be understood as a module, fragment or part of code that represents executable instructions including one or more steps for implementing a particular logical function or process, and the scope of the preferred implementation of the present disclosure includes additional implementations, which may not be in the order shown or discussed, It includes performing functions in a basically simultaneous manner or in a reverse order according to the functions involved, which should be understood by those skilled in the art to which the embodiments of the present disclosure belong.

It should be understood that parts of the present disclosure may be implemented in hardware, software, firmware, or a combination thereof. In the above described embodiments, a plurality of steps or methods may be implemented with software or firmware stored in memory and executed by a suitable instruction execution system. For example, if it is implemented in hardware, as in another embodiment, it can be implemented by any of the following technologies known in the art or their combination: discrete logic circuit with logic gate circuit for realizing logic function of data signal, application specific integrated circuit with appropriate combined logic gate circuit, programmable gate array (PGA), field programmable gate array (FPGA), etc.

Those skilled in the art can understand that all or part of the steps carried by the method of realizing the above embodiments can be completed by instructing the relevant hardware through a program, and the program can be stored in a computer-readable storage medium. When the program is executed, it includes one or a combination of the steps of the method embodiments.

In addition, the functional units in various embodiments of the present disclosure can be integrated in a processing module, or each unit can exist separately, or two or more units can be integrated in one module. The above integrated modules can be implemented in the form of hardware or software function modules. If the integrated module is realized in the form of software function module and sold or used as an independent product, it can also be stored in a non-transitory computer-readable storage medium.

The storage medium mentioned above can be read-only memory, magnetic disk or optical disk, etc.

In the description of this specification, the description referring to the terms "one embodiment", "some embodiments", "example", "specific example", or "some examples" means that the specific features, structures, materials, or features described in connection with the embodiments or examples are included in at least one embodiment or example of the present disclosure. In this specification, the schematic expression of the above terms does not necessarily refer to the same embodiments or examples. Moreover, the specific features, structures, materials, or features described may be combined in a suitable manner in any one or more embodiments or examples.

Although the embodiments of the present disclosure have been shown and described above, it can be understood that the above embodiments are exemplary and cannot be understood as limitations of the present disclosure. Those skilled in the art can change, modify, replace and modify the above embodiments within the scope of the present disclosure.

The invention claimed is:

1. A data transfer method, performed by a Bluetooth gateway, comprising:
    obtaining a first data packet reported by a first node device;
    receiving a second data packet forwarded by a signal amplifier, wherein the second data packet is reported by a second node device to the signal amplifier;
    processing the first data packet and the second data packet to obtain target data information; and
    transferring the target data information to a server,
    wherein, before receiving a second data packet forwarded by a signal amplifier, the method further comprising:
    obtaining component information of a second communication component in the signal amplifier; and
    configuring second scan information of the second communication component according to the component information, wherein the second data packet is reported to the signal amplifier by the second node device via the second communication component,
    wherein configuring second scan information of the second communication component according to the component information, further comprises:
    determining the second scan information according to the component information;
    generating a scan configuration message according to the second scan information; and
    transferring the scan configuration message to the signal amplifier, so that the signal amplifier configures the second communication component with the second scan information in response to the scan configuration message.

2. The method according to claim 1, wherein processing the first data packet and the second data packet to obtain target data information, further comprises:
    performing a protocol conversion on the first data packet to obtain first data information;
    performing the protocol conversion on the second data packet to obtain second data information; and
    processing the first data information and the second data information to obtain the target data information.

3. The method according to claim 2, further comprising:
    determining a data transfer protocol supported by a target protocol stack in the Bluetooth gateway,
    wherein performing a protocol conversion on the first data packet to obtain first data information, further comprises performing the protocol conversion on the first data packet with the data transfer protocol to obtain the first data information, and
    wherein performing the protocol conversion on the second data packet to obtain second data information further comprises performing the protocol conversion on the second data packet with the data transfer protocol to obtain the second data information.

4. The method according to claim 2, wherein processing the first data information and the second data information to obtain the target data information, further comprises:
    processing the first data information and the second data information by an application service in the Bluetooth gateway to obtain a processing result information; and
    using the processing result information as the target data information.

5. The method according to claim 1, wherein, before obtaining a first data packet reported by a first node device, the method further comprising:
    configuring first scan information for a first communication component in the the Bluetooth gateway; and
    wherein obtaining a first data packet reported by a first node device, further comprises:
    determining a first scan range according to the first scan information; and
    obtaining the first data packet reported by the first node device in the first scan range, wherein the first data packet is reported to the Bluetooth gateway by the first node device via the first communication component.

6. The method according to claim 3, further comprising:
    receiving an initial data packet transferred by the server;
    performing the protocol conversion on the initial data packet with the data transfer protocol, to obtain a data packet to be transferred; and
    transferring the data packet to be transferred to the first node device and the signal amplifier, respectively, so that the signal amplifier forwards the data packet to be transferred to the second node device.

7. A data transfer method, performed by a signal amplifier, comprising:
   obtaining a second data packet reported by a second node device; and
   forwarding the second data packet to a Bluetooth gateway so that the Bluetooth gateway processes a first data packet and the second data packet to obtain target data information, wherein the first data packet is reported to the Bluetooth gateway by a first node device,
   wherein, before obtaining a second data packet reported by a second node device, the method further comprises:
   receiving a scan configuration message;
   parsing second scan information from the scan configuration message; and
   configuring a second communication component in a signal amplifier with the second scan information, wherein the second data packet is reported to the signal amplifier by the second node device via the second communication component.

8. The method according to claim 7, wherein obtaining a second data packet reported by a second node device, further comprises:
   determining a second scan range according to the second scan information; and
   obtaining the second data packet reported by the second node device in the second scan range.

9. The method according to claim 7, further comprising:
   receiving a data packet to be transferred forwarded by the Bluetooth gateway;
   determining a communication transfer protocol supported by the second communication component;
   performing a protocol conversion on the data packet to be transferred with the communication transfer protocol, to obtain a target data packet; and
   transferring the target data packet to the second node device.

10. A Bluetooth gateway, comprising:
    a processor that is configured to obtain a first data packet reported by a first node device and receive a second data packet forwarded by a signal amplifier, and provide the first data packet and the second data packet to an application service, wherein the second data packet is reported to the signal amplifier by a second node device,
    wherein the application service is configured to process the first data packet and the second data packet to obtain target data information, and transfer the target data information to a server,
    wherein the processor is further configured to obtain component information of a second communication component in the signal amplifier, and configure second scan information of the second communication component according to the component information, wherein the second data packet is reported to the signal amplifier by the second node device via the second communication component,
    wherein the processor is further configured to determine the second scan information according to the component information, generate a scan configuration message according to the second scan information, and transfer the scan configuration message to the signal amplifier, so that the signal amplifier configures the second communication component with the second scan information in response to the scan configuration message.

11. The Bluetooth gateway according to claim 10, further comprising:
    a target protocol stack that is configured to provide a data transfer protocol;
    wherein the processor is further configured to perform a protocol conversion on the first data packet with the data transfer protocol to obtain the first data information, perform the protocol conversion on the second data packet with the data transfer protocol to obtain the second data information, and provide the first data information and the second data information to the application service, and
    wherein the application service is further configured to process the first data information and the second data information to obtain the target data information.

12. The Bluetooth gateway according to claim 11, wherein:
    the application service is further configured to process the first data information and the second data information to obtain a processing result information, and use the processing result information as the target data information.

13. The Bluetooth gateway according to claim 11, wherein:
    the processor is further configured to configure first scan information for a first communication component in the Bluetooth gateway, before obtaining the first data packet reported by the first node device, wherein the first scan information indicates a first scan range, and
    wherein the Bluetooth gateway further includes the first communication component further configured to obtain the first data packet reported by the first node device in the first scan range, and forward the first data packet to the processor.

14. The Bluetooth gateway according to claim 11, wherein:
    the processor is further configured to receive an initial data packet transferred by the server, perform the protocol conversion on the initial data packet with the data transfer protocol, obtain a data packet to be transferred, and transfer the data packet to be transferred to the first node device and the signal amplifier, respectively, so that the signal amplifier forwards the data packet to be transferred to the second node device.

15. A signal amplifier, comprising:
    a processor that is configured to implement the data transfer method according to claim 7.

* * * * *